(12) United States Patent
Kim

(10) Patent No.: US 11,195,265 B2
(45) Date of Patent: Dec. 7, 2021

(54) SERVER AND METHOD FOR RECOGNIZING IMAGE USING DEEP LEARNING

(71) Applicant: LG CNS CO., LTD., Seoul (KR)

(72) Inventor: Kyung Yul Kim, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 198 days.

(21) Appl. No.: 16/354,626

(22) Filed: Mar. 15, 2019

(65) Prior Publication Data

US 2020/0184629 A1    Jun. 11, 2020

(30) Foreign Application Priority Data

Dec. 6, 2018 (KR) .................. 10-2018-0155922

(51) Int. Cl.
```
G06T 7/00      (2017.01)
G06N 3/04      (2006.01)
G06N 3/08      (2006.01)
G06T 3/60      (2006.01)
G06K 9/46      (2006.01)
```
(52) U.S. Cl.
CPC .............. *G06T 7/0004* (2013.01); *G06K 9/46* (2013.01); *G06N 3/0454* (2013.01); *G06N 3/084* (2013.01); *G06T 3/60* (2013.01); *G06T 2207/20081* (2013.01); *G06T 2207/20084* (2013.01)

(58) Field of Classification Search
CPC ......... G06T 7/0002–0016; G06T 2207/20081; G06T 2207/20084; G06K 9/46; G06N 3/0454; G06N 3/60; G06N 3/84
See application file for complete search history.

(56) References Cited

U.S. PATENT DOCUMENTS

2017/0178361 A1* 6/2017 Berezhna ............... G01N 33/52
2018/0300434 A1* 10/2018 Hu ........................... G03F 7/705
2018/0322623 A1* 11/2018 Memo ................... G06N 3/084

FOREIGN PATENT DOCUMENTS

KR            101863196 B1 *  6/2018

\* cited by examiner

*Primary Examiner* — Sean T Motsinger
(74) *Attorney, Agent, or Firm* — KED & Associates LLP

(57) ABSTRACT

Provided are a server and method for recognizing an image to determine whether an inspection target is faulty. The method includes generating a new image by transforming N images acquired from an inspection target into one or more channel spaces, and extracting a feature value by learning N images acquired by separating the new image according to channels.

18 Claims, 6 Drawing Sheets

| 0 | 0 | 255 | 0 | 0 |
|---|---|---|---|---|
| 0 | 0 | 0 | 255 | 0 |
| 255 | 0 | 255 | 0 | 0 |
| 0 | 255 | 0 | 0 | 0 |
| 0 | 0 | 0 | 0 | 255 |

SERVER AND METHOD FOR RECOGNIZING IMAGE USING DEEP LEARNING

CROSS-REFERENCE TO RELATED APPLICATION(S)

This application claims priority under 35 U.S.C. § 119 to Korean Application No. 10-2018-0155922 filed on Dec. 6, 2018, whose entire disclosure is hereby incorporated by reference.

BACKGROUND

1. Field

The present application relates to a server and a related method to recognize an image using deep learning, and more particularly, to a server and a method to recognize an image to determine whether an inspection target is faulty.

2. Background

In processes in various technical fields, images of inspection targets may be taken, and the images may be evaluated to determine whether the inspection targets are faulty. For example, an image of a manufactured product may be taken and evaluated to identify a possible manufacturing flaw in the product.

Typically, a feature of an inspection target is evaluated by capturing an image of the inspection target, and evaluating a region of the image associated with the feature. For example, a pixel value corresponding to the region of the image associated with the feature may be compared with a reference value for that region on the basis of a recipe defined by a user to evaluate the feature. For example, a user may identify an exemplar (e.g., an example target having a "correct" version of the feature), and the reference value may be associated of an attribute (e.g., a color, intensity, brightness, texture, shape, pattern, etc.) of a corresponding region in a captured image of the exemplar.

According to this methodology, when the inspection target is identified as potentially faulty based on a comparison of the reference value and a pixel value in an acquired image, a user would typically manually reinspect the inspection target to verify the presence of a fault and to diagnose the fault. For example, various factors, such as ambient light conditions, may affect a captured image such that a pixel value in a captured image may differ from a reference value even if the feature of the inspection target does not have a fault. Furthermore, it is generally not possible to classify types of faults in consideration of correlations among acquired images. For instance, the image analysis may identify a possible difference between an exemplar and the inspection target in a pixel associated with a feature, but the image analysis typically cannot determine, for example, whether the feature in the inspection target is absent, damaged, improperly positioned, mispainted, etc.

Also, since the reference value is generally based on a user's subjective judgement, the reliability of a determination of whether the inspection target is faulty may be degraded. For example, as previously described, the reference value may be determined based on an exemplar selected by a user, but an appearance of the feature in the exemplar may differ from an appearance of the feature in other acceptable inspection targets such that the reference value may not reflect a proper basis for identifying a fault in the inspection target. Consequently, it may be desirable to develop a technology to automatically determine whether an inspection target is faulty on the basis of comparisons and correlations among acquired images.

BRIEF DESCRIPTION OF THE DRAWINGS

The embodiments will be described in detail with reference to the following drawings in which like reference numerals refer to like elements wherein.

DETAILED DESCRIPTION

Figure 1:
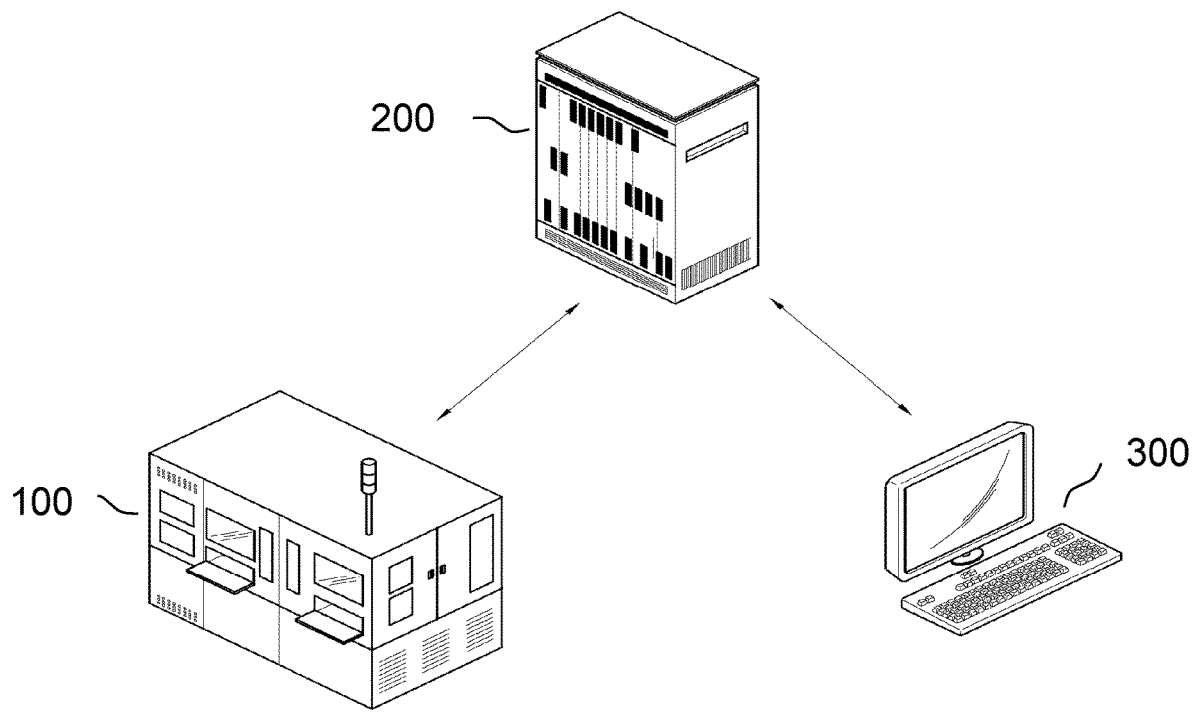
FIG. 1 schematically shows a configuration of a system for recognizing an image on the basis of deep learning according to an exemplary embodiment of the present application.

FIG. 1 schematically shows an example of a system to capture and process one or more images of an inspection target based on deep learning techniques in an exemplary embodiment of the present application. Referring to FIG. 1, the system for processing an image on the basis of deep learning according to an exemplary embodiment of the present application includes an inspection equipment (or camera or image sensor) 100, an image recognition server (or image computer) 200, and a user terminal 300. It should be appreciated that the system to capture and process one or more images of an inspection target may include more, fewer, or different component than those shown in FIG. 1.

The inspection equipment 100 may include a light source that emits light toward an inspection target and may acquire a plurality of images of the inspection target. The light may be emitted at various angles with respect to the inspection target and may be laser light (e.g., light in a nearly parallel, nearly monochromatic, and coherent beam), by way of an example. For reference, the inspection target may be a glass substrate, a liquid crystal display (LCD), a light-emitting diode (LED), an organic light-emitting diode (OLED), a quantum dot light-emitting diode (QLED), a substrate or a wafer for a semiconductor device, etc. but is not limited thereto. Different images of the inspection target may be acquired by the inspection equipment 100 as the light is emitted at various (e.g., different) angles, and the plurality of acquired images may be transmitted to the image recognition server 200 for processing. For example, the acquired images may be transmitted to the image recognition server 200 in real time (e.g., as the images are captured) or may be stored for transmission to the image recognition server 200 at a later time.

As described in greater detail below, the image recognition server 200 may generate a new image by stacking or otherwise combining a number (N) of images transmitted from the inspection equipment 100 in one or more channel spaces. In one example, the image recognition server 200 may generate the new image by stacking the N images into an N-channel (e.g., N-dimensional) space. Subsequently, the image recognition server 200 may also extend the data by artificially modifying the generated image. The number of images may be increased M times by data extension, and in this way, it is possible for the image recognition server 200 to generate a model robust to identifying a new type of fault. For example, the image recognition server 200 may learn or otherwise process the generated new image using a neural network structure and then may generate an image classification model. The image recognition server 200 to then evaluate the inspection target based on image classification model and may determine whether the inspection target is faulty on the basis of the generated image classification model.

The user terminal 300 may access the image recognition server 200 to receive information regarding the image classification model and may receive an inspection result from the image recognition server 200 indicating whether the inspection target is faulty on the basis of the generated image classification model. The user terminal 300 may include, for example, any kind of communication or computing device which may be connected to the image recognition server 200 and/or another external server associated with the image recognition server 200 (e.g., a server storing and forwarding data generated by the image recognition server 200) via a wireless communication network. For example, the user terminal 300 may correspond to a cellular phone, a smart phone, a personal digital assistant (PDA), a portable multimedia player (PMP), or a tablet personal computer (PC). Furthermore, the user terminal 300 may correspond to any device that is capable of being connected to a communications or data network, such as a desktop PC, a tablet, PC, a laptop PC, and an Internet protocol television (IPTV) with a set-top box.

Figure 2:
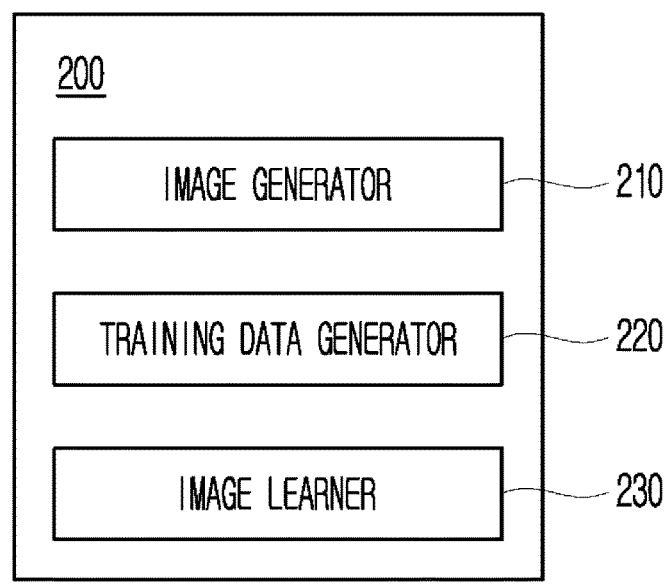
FIG. 2 is a block diagram illustrating a configuration of a server for recognizing an image according to an exemplary embodiment of the present application.

FIG. 2 is a block diagram illustrating examples of components of the image recognition server 200 according to an exemplary embodiment of the present application. Referring to FIG. 2, the image recognition server 200 may include an image generator (or image generation processor) 210, a training data generator (or training data generation processor) 220, and an image learner (or image learning processor) 230. It should be appreciated that the image recognition server 200 may include more, fewer, or different component than those shown in FIG. 2.

The image generator 210, the training data generator 220, and the image learner 230 may be program modules or pieces of hardware which may communicate with an external device. For example, one or more of the image generator 210, the training data generator 220, and the image learner 230 may include a memory to store instructions, a processor to execute the instructions, a communication interface to receive input data or to output data associated with execution of the instructions, and a bus to exchange data between the memory, the processor, and the communications interface. These program modules or pieces of hardware may be included in the image recognition server 200 or another device capable of communicating with the image recognition server 200 in the form of an operating system, application program modules, and other program modules and may be physically stored in various known storage devices. Meanwhile, these program modules or pieces of hardware encompass routines, subroutines, programs, objects, components, data structures which execute specific tasks to be described below or execute specific abstract data type but are not limited thereto.

The image generator 210 may stack N images received from the inspection equipment 100 in an N-channel space. For example, a new image may be generated by stacking three images in a 3-channel space. As used herein, stacking may refer to identifying different attributes values for pixels in different images. For example, as described above, the inspection equipment 100 may emit light to an inspection target at various angles and then acquire a plurality of images of the inspection target while lit at various angles using a photographic device. Assuming that the inspection target is a glass substrate or similar material, the shape, size, position, light and shade, etc. of a shadow resulting from refraction may vary according to a method or angle of projecting or transmitting laser light. It is possible to acquire three different refracted shadow images by changing the method of projecting or transmitting laser light. The acquired images may be a plurality of grayscale images, and the images may be transmitted to the image recognition server 200.

Figures 3, 4:
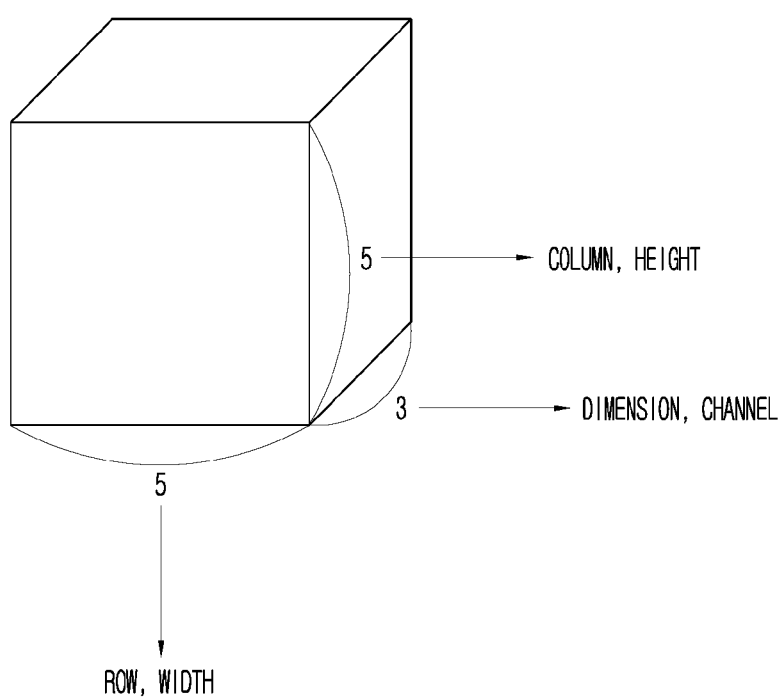
FIG. 3 is a diagram showing an example of a grayscale image acquired according to an exemplary embodiment of the present application.
FIG. 4 is a diagram illustrating a 3-channel space according to an exemplary embodiment of the present application.

A grayscale image is an image in which each region (or pixel) may be presented by a value indicating a relative brightness level in that region. For example, each region in a greyscale image may represent black and white levels associated with values of 0 to 255 (e.g., a byte image, where this number is stored as an 8-bit integer giving a range of possible values from 0 to 255, with a value of zero being associated with black and value of 255 being associated with white). For example, as shown in FIG. 3, a sample grayscale image may be a 5×5 matrix (e.g., an image having a height of five pixels in height and a width of five pixels) having 25 regions that are associated with, respectively, grayscale values of 0 to 255. Although the example shown in FIG. 3 includes six regions having a value of 255 and another 19 regions having a value of 0, it should be appreciated that one or more of the regions in an image matrix may have values between 0 and 255.

The image generator 210 may generate a new image by stacking N grayscale images acquired from a specific inspection target in an N-channel space. As used herein, a channel may refer to values for characteristic values associated with pixels from a single image. For example, when the received grayscale images are in the form shown in FIG. 3, a 5×5 grayscale image may be placed in one channel associated with the above-described grayscale value.

Meanwhile, an N-channel space denotes a space which may be represented by a channel value×a width value×a height value, as shown in FIG. 4. For example, a red-green-blue (RGB) color image may be represented by a total of three channels with values of 0 to 255. In this case, one R channel, one G channel, and one B channel may be included in the RGB color image.

Figure 5:
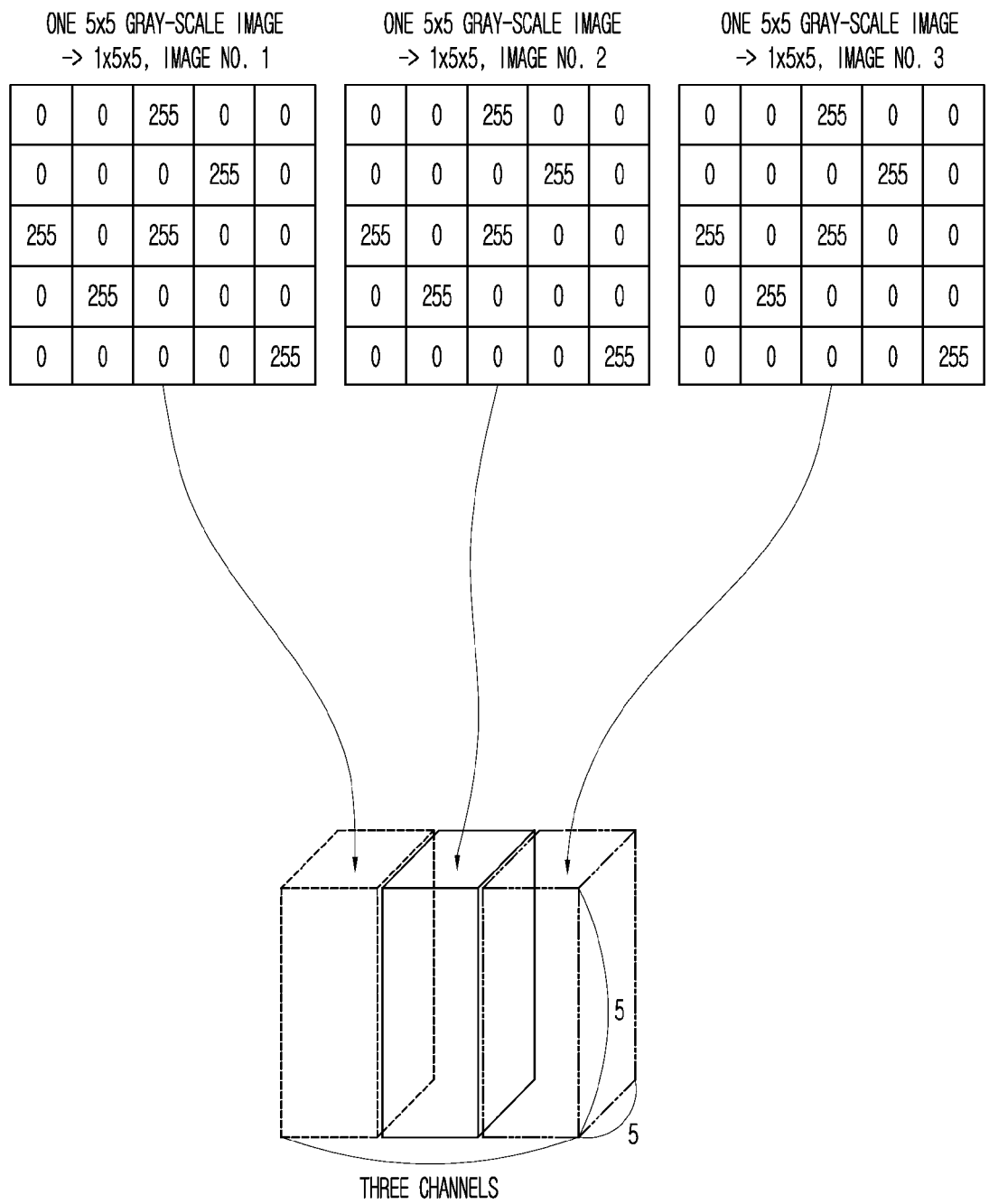
FIG. 5 is a diagram illustrating a process in which three grayscale images are transformed into a 3-channel space according to an exemplary embodiment of the present application.

Assuming that three grayscale images are received as images of an inspection target, the three grayscale images may be separately transformed, respectively, into the R channel, the G channel, and the B channel, that is, a total of three channels, as shown in FIG. 5. In this way, the three separate grayscale images may be transformed into a 3-channel space. It should be appreciated that although an example in which there are three grayscale images, and the three grayscale images are transformed into a 3-channel space is shown n FIG. 5 and is described below, the number of grayscale images and an associated number number of channels may vary. For example, five grayscale images may be captured and may be transformed into a 5-channel space corresponding, for instance to an inspection target that, when viewed in plan, is illuminated from above and in north, south, east, and west directions.

Figure 6:
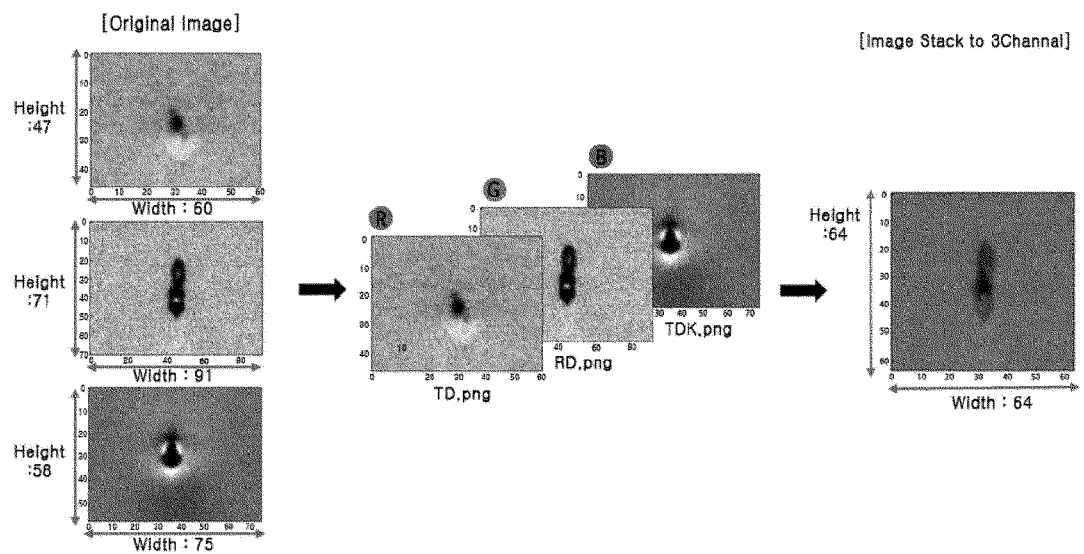
FIG. 6 shows an example of a new image generated by transforming three grayscale images into a 3-channel space according to an exemplary embodiment of the present application.

FIG. 6 shows an example of a new image that generated by transforming three grayscale images into a 3-channel space (e.g., into a RGB space). Referring to FIG. 6, it should be appreciated that the three grayscale images to be combined may have different widths and/or heights. Furthermore, when the three grayscale images (e.g., Original Images) are transformed into a 3-channel space, a new image (e.g., Image Stack to 3Channel) having a fixed height and width may be generated. To combine the different sized grayscale images, the training data generator 220 may generate new training data by modifying one or more images generated by the image generator 210 to form combinable images of similar sizes.

Figure 7:
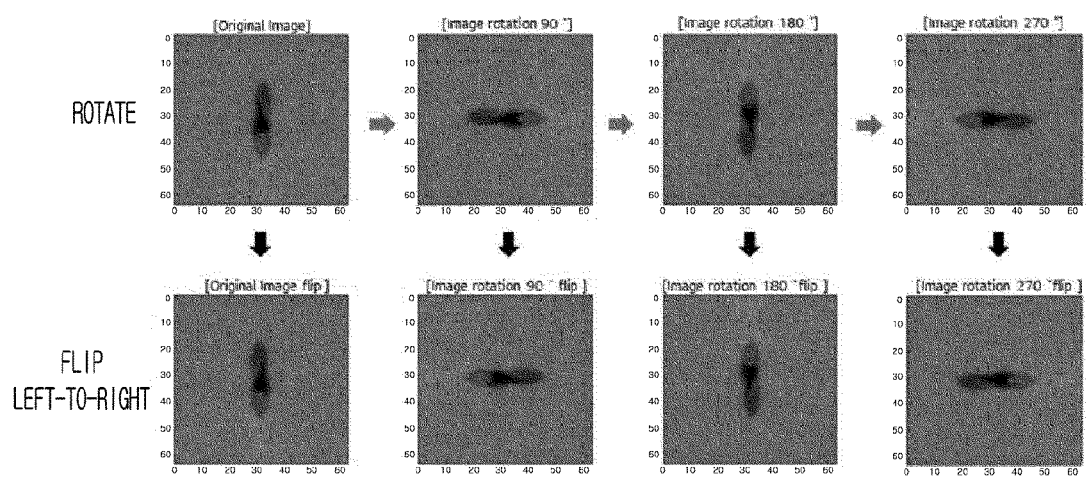
FIG. 7 shows modified examples of an image transformed into a 3-channel space according to an exemplary embodiment of the present application.

FIG. 7 shows various modified examples of images that may be generated by the image generator 210. Referring to FIG. 7, three images may be generated by rotating a captured image (e.g., the Original Image) generated by the image generator 210 by, respectively, 90 degrees, 180 degrees, and 270 degrees. Additionally, four more images may be additionally generated by converting the original image and the newly generated three images into images flipped left-to-right (e.g., to form a mirror image). Thus, a total of seven new images may be additionally generated from an originally captured image through the above-described rotation and flipping process. Accordingly, the training data generator 220 may generate additional images to achieve N total images (e.g., 8 images in the example depicted in FIG. 7) by various transformations, such as rotating and flipping an originally obtained image in the above described manner. It should be appreciated, however, that additional, different, or fewer images may be generated by different techniques, such as flipping an image up-to-down along a horizontal axis, flipping an image along a diagonal axis, etc.

The image learner 230 may learn attributes of the images generated by the training data generator 220 through a neural network structure, as described below. The images generated by the training data generator 220 may be obtained by rotating or flipping the image generated by the image generator 210, and as previously described with respect to FIG. 5, the original image generated by the image generator 210 may be composed of three channels (e.g., RGB channels), and the images generated by the training data generator 220 (e.g., through various rotations and/or flipping of the original three-channel image from image generator 210) may also include three channels. Therefore, the 3-channel images generated by the training data generator 220 may be separated according to the respective channels.

An embodiment of the present application may employ a learning method in which a deep learning technology, which is a type of machine learning, is used. Machine learning generally relates to a field of artificial intelligent evolved from the study of pattern recognition and computer learning theory. Machine learning may improve an intelligence base using surroundings as training elements. The improved intelligence base may be used to perform a specific task, and information obtained during the task is applied to training elements. Machine learning is a technology that may be used for studying and building a system and algorithm for performing learning, making a prediction, and for improving its own performance on the basis of experimental data. According to machine learning algorithms, a specific model may be built to derive a prediction or determination from input data. As described below, machine learning may be classified into memory-based learning with direct delivery of new knowledge, supervised leaning, analogical learning, inductive learning, etc. according to a learning strategy.

Memory-based learning with direct delivery of new knowledge generally does not require inference or knowledge transformation. Modifications of such learning may include a learning method which is developed and changed by an external object or program, a learning method in which learning is performed only with the memory of given facts or data without inference for input information, and the like.

In supervised learning, input information may be converted into an internal representation, and new information may integrated with existing original knowledge. To increase the knowledge of a machine learning system, pieces of information may be appropriately combined and given to the machine learning system from the outside. To transform several kinds of supervision into an executable program, the supervised learning may include, for example, performing a request operation of requesting supervision, an interpretation operation of transforming external supervision into an internal representation, an operationalization operation of converting the internal representation into an operator to reduce a difference between a supervision level and a level applied by a performance element, an integration operation of integrating new knowledge with existing knowledge, and an evaluation operation of evaluating newly generated knowledge.

In analogical learning, existing information may be modified or extended to obtain a new fact. According to analogical learning, a strong similarity with a desired new concept or technology may be derived from a knowledge transformation process, and the new concept or technology may be helpfully used in a new situation. This type of machine learning may be used to transform a developed computer program into a program which is run differently than originally designed. This type of machine learning may require more inference than memory-based learning or supervised learning.

According to inductive learning, when a set of examples which appropriately describe a certain concept (e.g., positive examples) and examples which negate the concept (e.g., counter examples or negative examples) are given, description of a general concept may be inferred to appropriately describe characteristics of all the positive examples while excluding characteristics of the negative examples. This learning method has been most commonly studied in the artificial intelligence field. For inference, inductive learning may use much more resources than supervised learning. When a general concept is not given from an external source, inductive learning may involve more efforts for inference than analogical learning. Inductive learning may be classified into a method of providing an example from an external source, a method of generating and providing an example in a system, a method of providing examples from an external environment, a method of using only positive examples, a method of using both positive and negative examples, and the like.

Deep learning is a neural network-based model with high complexity. While an existing neural network model is a relatively simple model which uses one hidden layer, a deep learning model uses a large number of hidden layers. A series of neural layers, such as V1, V2, and V4, which gradually extract complex information are found in the visual cortex of human brains, and deep learning is a machine learning model which simulates such a structure. For example, in the structure of deep learning, comparatively simple information processing (e.g., line detection) may be performed in lower layers, and more complex information (e.g., edge detection and object recognition) may be extracted in upper layers.

The core idea of deep learning may be considered as automation for integrating two operations of feature extraction and pattern classification, which are separated to solve a complex problem according to a related art. According to conventional techniques, a problem may be solved with two operations: first, features appropriate for problem solving may be extracted through data preprocessing and processing, and then a pattern classifier may be trained using the extracted features as training data. In a deep learning structure, a preprocessing operation for feature extraction may be included in an overall learning process. In other words, the deep learning structure may employ an integrated problem solving method in which unprocessed original data is directly learned. Particularly, in the case of complex data which has a great number of dimensions such as image data, the deep learning structure may enable a machine to automatically extract and use information which may be lost through a preprocessing process. In some example, even solutions which are excluded through an existing preprocessing method or so-called feature engineering may be searched, and thus it may be possible to extract and use more useful information.

The performance of deep learning models may be improved using massive models that have learned massive amounts data. Accordingly, embodiments of the present application may adopt a convolutional neural network (CNN). A CNN may use convolution kernels to automatically extract useful features and representations from data having a great number of dimensions such as an image. For this reason, the same parameter value may be obtained even at different positions, and it may be possible to reduce the number of dimensions to be learned by reducing the number of parameters. When a CNN model is used, overlearning may be prevented, and useful features may be extracted.

A CNN is generally designed to solve problems of supervised learning and is focused on discriminative learning for classifying input data. This feature of CNN may improve pattern classification performance, and a CNN may generate complex features and representations using a great number of neuron layers. A CNN is a neural network which may be obtained by adding a convolution layer and a sub-sampling layer to a fully connected layer of a hidden layer that an existing neural network has and improved in performance by subdividing the structure. Deep learning employing such a CNN exhibits may excellent accuracy in comparison to other machine learning techniques.

A CNN may extracts features through convolutions and performs classification with a neural network. In image processing, a convolution may process an image using a mask having weights. This process may include putting a mask on an input image, separately multiplying pixel values of the input image and the weights of the mask, and then determining the sum of multiplications as a pixel value of an output image. The mask used in the image processing may be referred to as a filter, window, or kernel.

After the window is put on the input image, convolution values may be calculated while the window is moved. This design is intended to extract a feature from the image. Features may be extracted from several images so that a feature robust to image distortion, deformation, or the like may be obtained. When a convolution and subsampling are repeated, extracted features may remain. When the features are input to each input terminal of the neural network, learning may be performed.

A CNN used in deep learning may be an artificial neural network, which have been researched in various fields of image processing and computer vision for understanding an image and extracting abstracted high level information, for example, a feature value, from the image, generating an image with new texture, or the like. Embodiments of the present application may employ a supervised learning algorithm and may structure a CNN to build a sub-neural network in a neural network.

Figure 8:
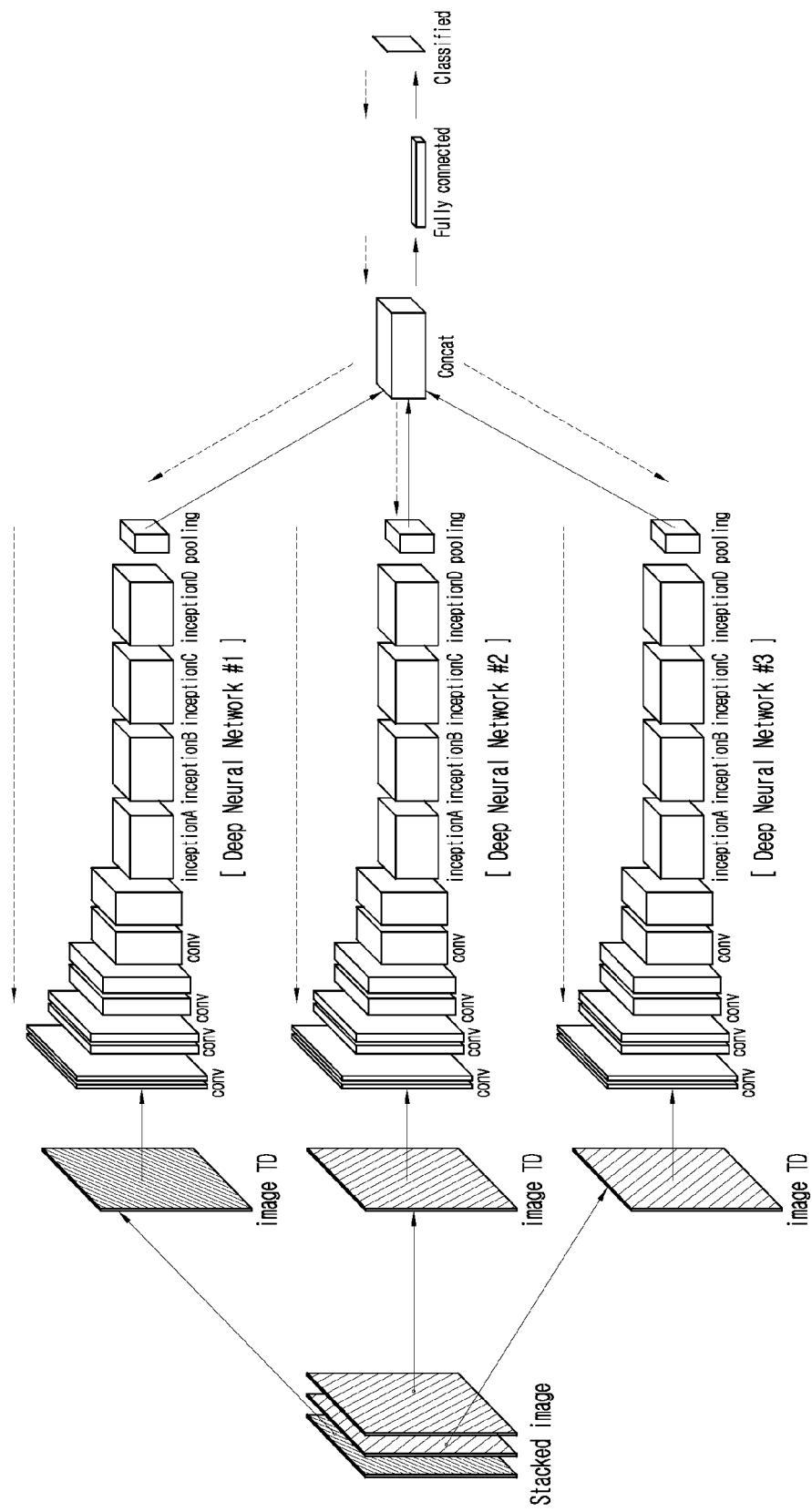
FIG. 8 illustrates an image learning process according to an exemplary embodiment of the present application.

In an exemplary embodiment of the present application, it is possible to define as many slave deep CNNs as the number of channels (three) in one master deep neural network structure (see FIG. 8). Images separated from one image according to channels may be simultaneously learned through the respective slave deep CNNs so that feature values of channel-specific images may be generated.

Channel-specific image separation may be performed by cutting an N-channel image on the basis of channel axes. To generate a classification model having high accuracy for learning, a backpropagation process may be additionally performed. For example, a feature value may be extracted from a separated image, and the feature value may be classified into a kind of fault. When the classification differs from a correct answer, errors may be reduced so as to find the correct answer again. To this end, a backpropagation process may be additionally performed. In FIG. 8, dotted arrows generally indicate backpropagation processes.

The image learner 230 may repeatedly perform a process of stacking or concating (e.g., combining) feature values generated in the above process. For example, feature values from different images in different channels may be evaluated and combined to determine a composite feature value, and the composite feature value may be evaluated to determine whether a feature of an inspection target is faulty. Finally, generated feature values may be transformed into the 3-channel space again, and such that it may be possible to classify a type of fault of the inspection target through results of the learning. For instance, different types of faults may be identified for different grayscale values in the 3-channel space.

A table below shows results of testing fault type classification performance of an existing visual inspection method for a glass substrate and a method according to an exemplary embodiment of the present application.

TABLE 1

| Classification | Accuracy in Fault Type Classification | |
|---|---|---|
| | Existing Vision Inspection | Present Application |
| Fault Type 1 | 70% | 98.7% |
| Fault Type 2 | 90% | 99% |
| Fault Type 3 | 90% | 100% |
| Fault Type 4 | 90% | 99% |

Referring to Table 1, according to an exemplary embodiment of the present invention, classification performance was improved by 28.7% (about 30%) regarding fault type 1 and was improved by 10% or more regarding other fault types.

Figure 9:
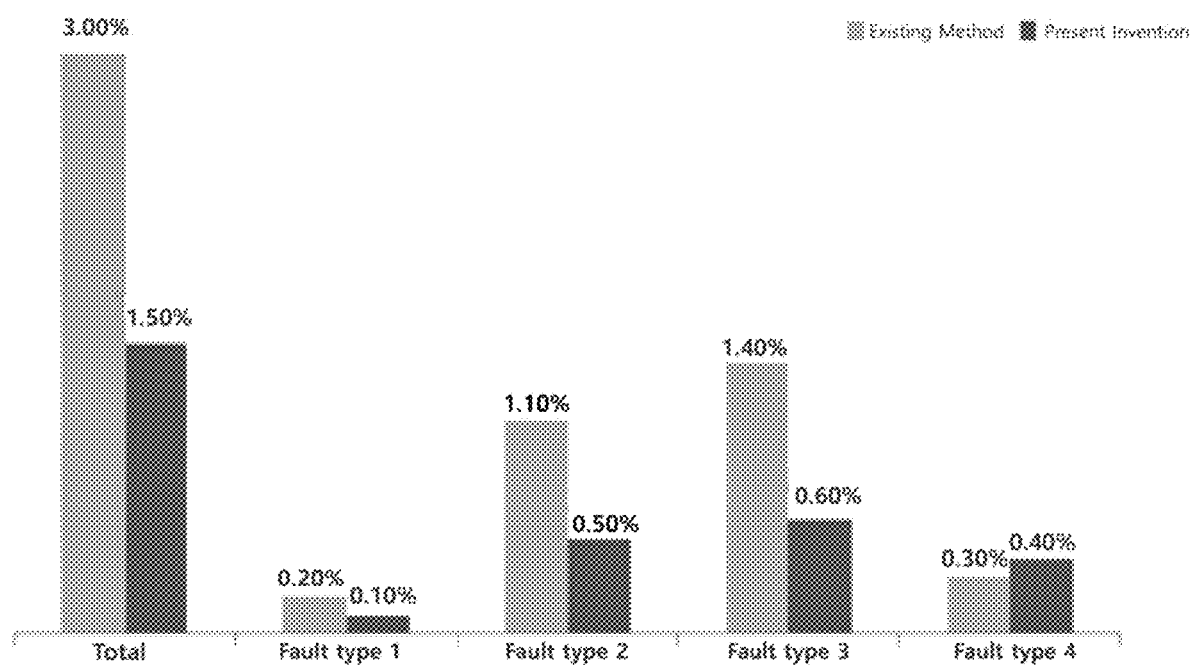
FIG. 9 illustrates graphs showing examples of improved detection rates of different types of faults in finished products according to an exemplary embodiment of the present application.

Meanwhile, referring to graphs shown in FIG. 9, it is possible to see that the exemplary embodiment of the present application showed an improved overall defect rate of finished products which is 1.5% higher than that of a conventional error detection method.

According to an exemplary embodiment of the present application, in the case of generating an image to generate a fault type classification model, N grayscale images are transformed into an N-channel space, image transformations are performed, and then the corresponding images are separated according to channels. Also, the separated images are simultaneously learned. Therefore, it is possible to learn the images on the basis of correlations among the N images and increase accuracy in extracting a feature value for determining whether an inspection target is faulty.

Also, according to an exemplary embodiment of the present application, a generated image is artificially modified to additionally generate a plurality of images, and the plurality of images are learned. Therefore, it is possible to generate a model robust to a new type of fault. Meanwhile, according to an exemplary embodiment of the present application, it is possible to increase productivity by minimizing errors in detecting a fault of an inspection target. Aspects of the present application are not limited to the above-described effects, and it should be understood that the effects include every effect that can be deduced from the configuration of the present application disclosed in the detailed description or claims.

Aspects of the present application broadly provide a method of determining whether an inspection target is faulty on the basis of automated image recognition. Aspects of the present application may be directed to providing a method of determining whether an inspection target is faulty with high accuracy using a learning method based on correlations among a plurality of images. Aspects of the present application may be directed to making it possible to generate a fault determination model which is robust to a new type of fault. Aspects of the present application may be directed to increasing productivity by minimizing errors in detecting a fault of an inspection target. Aspects of the present application are not limited to those mentioned above, and other objectives which have not been mentioned will become apparent from the following description.

According to an aspect of the present application, there is provided a method of recognizing an image to determine whether an inspection target is faulty, the method including: generating a new image by transforming N images acquired from an inspection target into one or more channel spaces; and extracting a feature value by learning N images acquired by separating the new image according to channels. The method may further include, after the generating of the new image, generating a plurality of modified images by modifying the new image.

The generating of the plurality of modified images may include generating images by rotating the new image by various angles and generating a plurality of modified images by flipping the rotated images left-to-right. The extracting of the feature value may include separating the plurality of modified images according to the respective channels and learning the separated images.

The one or more channel spaces may be N channel spaces. The N images acquired from the inspection target may be grayscale images. N may be three. The generating of the new image may include generating a new image having a specific width and height by stacking the N images acquired from the inspection target and having different widths and heights in an N-channel space.

The extracting of the feature value may include: defining slave convolutional neural networks (CNNs) in one or more master neural network structures; and applying the respective slave CNNs to the N images acquired by separating the new image according to the channels.

The extracting of the feature value may further include repeatedly stacking or concating feature values extracted by applying the slave CNNs. The extracting of the feature value may further include performing a backpropagation process when the slave CNNs are applied.

According to another aspect of the present application, there is provided a server for recognizing an image to determine whether an inspection target is faulty, the server including: an image generator configured to generate a new image by transforming N images acquired from an inspection target into one or more channel spaces; and an image learner configured to extract a feature value by learning N images acquired by separating the new image according to channels. The server may further include a training data generator configured to generate a plurality of modified images by modifying the new image.

The training data generator may generate images by rotating the new image by various angles and generate a plurality of modified images by flipping the rotated images left-to-right. The image learner may separate the plurality of modified images according to the respective channels and learn the separated images. The one or more channel spaces may be N channel spaces. The N images acquired from the inspection target may be grayscale images. N may be three.

The image generator may generate a new image having a specific width and height by stacking the N images acquired from the inspection target and having different widths and heights in an N-channel space. The image learner may define slave CNNs in one or more master neural network structures and extract feature values extracted by applying the respective slave CNNs to the N images acquired by separating the new image according to the channels.

The image learner may repeatedly stack or concat the feature values extracted by applying the slave CNNs. The image learner may perform a backpropagation process when applying the slave CNNs.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of evaluating an inspection target, the method comprising:
    generating a new image based on transforming first N images (N≥2) of an inspection target into a plurality of channel spaces; and
    calculating a feature value based on separating the new image into second N images according to channels,
    wherein the inspection target is evaluated based on the feature value,
    wherein the method further comprises, after generating the new image, generating a plurality of modified images based on modifying the new image,
    wherein the feature value is calculated further based on the plurality of modified images, and
    wherein calculating the feature value further includes separating the plurality of modified images according to the respective channels and determining attributes of the separated images.

2. A method of evaluating an inspection target, the method comprising:
    generating a new image based on transforming first N images (N≥2) of an inspection target into a plurality of channel spaces; and
    calculating a feature value based on separating the new image into second N images according to channels,
    wherein the inspection target is evaluated based on the feature value,
    wherein the method further comprises, after generating the new image, generating a plurality of modified images based on modifying the new image,
    wherein the feature value is calculated further based on the plurality of modified images, and
    wherein the generating of the plurality of modified images includes:
        generating a first plurality of modified images based on rotating the new image by a plurality of angles, and
        generating a second plurality of modified images based on flipping the rotated first plurality of modified images along a vertical axis.

3. The method of claim 1, wherein the plurality of channel spaces are N channel spaces.

4. The method of claim 1, wherein the first N images acquired from the inspection target are grayscale images.

5. The method of claim 1, wherein the first N images include three images that are transformed into three channel spaces.

6. The method of claim 1, wherein the new image has a width and a height, and wherein generating the new image includes stacking the first N images of the inspection target into an N-channel space, the first N images having widths and heights that differ from the width and the height of the new image.

7. A method of evaluating an inspection target, the method comprising:
    generating a new image based on transforming first N images (N≥2) of an inspection target into a plurality of channel spaces; and
    calculating a feature value based on separating the new image into second N images according to channels,
    wherein the inspection target is evaluated based on the feature value,
    wherein calculating the feature value includes:
        defining slave convolutional neural networks (CNNs) in one or more master neural network structures; and
        applying the respective slave CNNs to the second N images acquired based on separating the new image according to the channels.

8. The method of claim 7, wherein calculating the feature value further includes repeatedly at least one of stacking or concatenating feature values extracted by applying the slave CNNs to the second N images.

9. The method of claim 7, wherein calculating the feature value further includes performing backpropagation when applying the slave CNNs to the second N images.

10. A server comprising:
an image generation processor configured to generate a new image based on transforming first N (N≥2) images of an inspection target into a plurality of channel spaces; and
an image learning processor configured to calculate a feature value based on processing second N images that are acquired based on separating the new image according to channels,
wherein the server further comprises, a training data generating processor configured to generate a plurality of modified images based on modifying the new image, and
wherein the image learning processor further separates the plurality of modified images according to the respective channels and determines attributes of the separated images.

11. A server comprising:
an image generation processor configured to generate a new image based on transforming first N (N≥2) images of an inspection target into a plurality of channel spaces;
an image learning processor configured to calculate a feature value based on processing second N images that are acquired based on separating the new image according to channels; and
a training data generation processor configured to generate a plurality of modified images based on modifying the new image,
wherein the training data generation processor further generates first images based on rotating the new image by various angles and generates second images based on flipping the rotated first images left-to-right.

12. The server of claim 10, wherein the plurality of channel spaces are N channel spaces.

13. The server of claim 10, wherein the first N images of the inspection target are grayscale images.

14. The server of claim 10, wherein the first N images include three images.

15. A server comprising:
an image generation processor configured to generate a new image based on transforming first N (N≥2) images of an inspection target into a plurality of channel spaces; and
an image learning processor configured to calculate a feature value based on processing second N images that are acquired based on separating the new image according to channels, and
wherein the image generation processor further generates a first image having a width and a height based on stacking the first N images acquired from the inspection target in an N-channel space, the first N images having widths and heights that differ from the widths and the height of the first image.

16. The server of claim 10, wherein the image learning processor further defines slave convolutional neural networks (CNNs) in one or more master neural network structures and extracts feature values based on applying the respective slave CNNs to the second N images acquired based on separating the new image according to the channels.

17. The server of claim 16, wherein the image learning processor repeatedly at least one of stacks or concatenates the feature values extracted based on applying the slave CNNs to the second N images.

18. The server of claim 16, wherein the image learning further performs backpropagation when applying the slave CNNs to the second N images.

* * * * *